United States Patent [19]

Winik

[11] Patent Number: 5,781,580
[45] Date of Patent: Jul. 14, 1998

[54] DIODE PUMPING MODULE

[75] Inventor: Michael Winik, Mazkeret Batia, Israel

[73] Assignee: Elop Electro-Optics Industries Ltd., Rehovot, Israel

[21] Appl. No.: 749,233

[22] Filed: Nov. 14, 1996

[30] Foreign Application Priority Data

Nov. 23, 1995 [IL] Israel ........................ 116106

[51] Int. Cl.$^6$ ........................ H01S 3/08
[52] U.S. Cl. ........................ 372/99; 372/75
[58] Field of Search ........................ 372/75, 99, 36

[56] References Cited

U.S. PATENT DOCUMENTS

| | | | |
|---|---|---|---|
| 3,284,722 | 11/1966 | Gray | 372/75 |
| 3,683,296 | 8/1972 | Scalise | 372/75 |
| 3,684,980 | 8/1972 | Kay | 372/75 |
| 4,949,346 | 8/1990 | Kuper et al. | 372/75 |
| 4,969,155 | 11/1990 | Kahan | 372/75 |
| 5,317,585 | 5/1994 | Gregor | 372/75 |
| 5,627,850 | 5/1997 | Irwin et al. | 372/75 |

Primary Examiner—Rodney B. Bovernick
Assistant Examiner—Robert E. Wise
Attorney, Agent, or Firm—Pollock, Vande Sande & Priddy

[57] ABSTRACT

The invention provides a diode pumping module for a laser system, including a laser rod and a diode light source for excitation of the laser rod, the diode source being constituted by at least one diode array, a dual-function optical coupler/heat conductor located on one side of the laser rod between the at least one diode array and the laser rod, and attached to the rod, which coupler/heat conductor guides the light from the diode source into the rod while adjusting the angular spread of the light and also serves as heat conductor, conducting heat away from the rod. The system further includes a dual-function heat conductor/light reflector located on the opposite side of the laser rod, and attached to the rod, which conductor/reflector conducts the heat away from the laser rod and reflects unabsorbed diode light back into the rod.

11 Claims, 1 Drawing Sheet

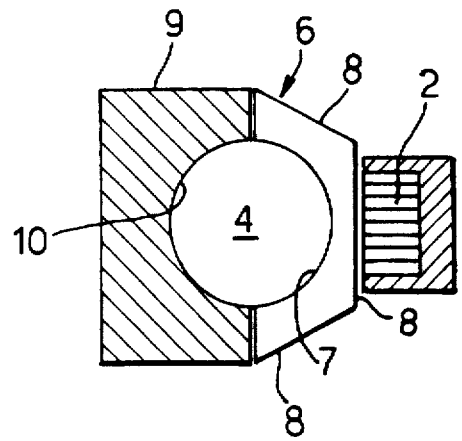
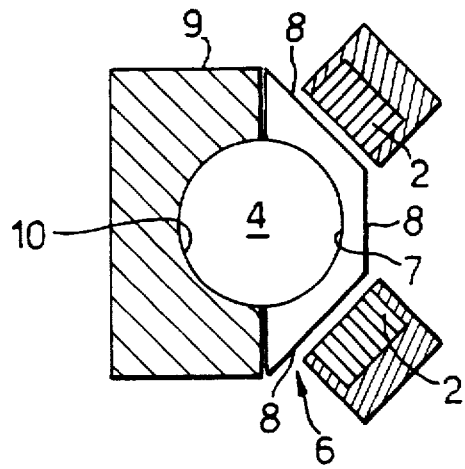
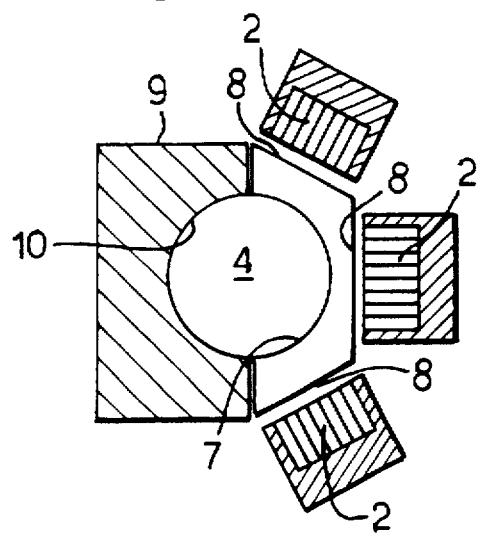
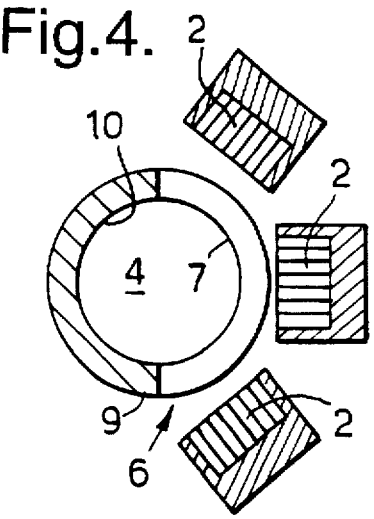

DIODE PUMPING MODULE

FIELD OF THE INVENTION

The present invention relates to lasers, and more particularly to a module for diode pumping of laser systems for efficient optical pumping of solid state laser material. The invention is applicable to solid-state diode-pumped lasers and diode-pumped laser amplifiers for generation and amplification of light.

BACKGROUND OF THE INVENTION

High energy diode-pumped lasers use laser diodes arranged for side pumping of the laser rod. The light emitted by the laser diodes enters perpendicular to the laser beam. The diode light is absorbed by the atoms in the laser rod, exciting the atoms, thus establishing an optical gain in the laser rod. The side pumping geometry allows a large excited cross-section of the laser rod, thus facilitating large energy storage and high energy extraction as required.

Ideally, high optical pumping efficiency of the laser rod is preferred, thus low thermal loading of the laser rod is obtained, resulting in a high-quality beam. In addition high-efficiency pumping will reduce the number of diode arrays required to obtain specified energy output, reducing further the size and the cost of the laser system. Therefore, improved laser systems create continuing demand for high efficiency, good beam quality and compact structures.

To obtain high pumping efficiency, good optical coupling of the diode light into the laser rod and adequate absorption of the diode light in the laser rod are required. The angular divergence of the diode light in the transverse plane is about 40°; thus, a substantial fraction of the light will miss the laser rod. In addition, another fraction of the light will be lost due to Fresnel reflections caused by the high index of refraction and small diameter of the laser rod.

Any focusing lenses which can be used to focus the diode light into the laser rod will cause light losses, due to limited lens aperture and optical lens coatings. For example, in the prior art U.S. Pat. No. 4,755,002 and U.S. Pat. No. 4,969,155, due to the aforementioned problems of coupling linear diode arrays into the laser rod, focusing lenses were utilized perceptively, reducing the optical coupling efficiency.

Another problem in high-energy diode-pumped lasers is the dissipation of heat produced in the laser rod during optical pumping. Heat dissipation in prior art arrangements and structures was performed using compressed gas or liquid coolants or solid heat conductors. Gas or liquid coolants limit the reliability of the laser system, since frequent preventive maintenance activity is required to address leaks of the coolant or degradation of its characteristics. Therefore, a solid heat conductor technique is preferred. In the prior art (e.g., U.S. Pat. No. 5,317,585), a transparent heat conductor was used, since the heat conductor of this particular design has to be optically transparent to allow the diode light to enter the laser rod. Optical transparency and thermal conductivity properties, however, are not readily optimized for both.

Another problem in high-energy diode-pumped lasers is the lack of radially symmetrical heat dissipation from the laser rod. This lack will generate thermal gradients in the laser rod and cause optical aberrations, spoiling the beam quality of the laser.

Also, to enhance compactness in a solid state laser, it is advantageous to combine requirements and to find solutions where a single component can perform more than one function. In this way, the size, weight and cost of a laser system can be reduced substantially.

SUMMARY OF THE INVENTION

It is thus one of the objects of the present invention to provide a diode pumping module for a laser system which efficiently couples the diode light into the laser rod directly without focusing lenses, by optimizing the index of refraction of the optical coupler surrounding the laser rod. The optical coupler minimizes Fresnel reflections by reducing the angle of incidence of the diode light with respect to the laser rod and by better index-of-refraction match between itself and the laser rod, and adjusts the transverse angular spread of the diode light to obtain uniform transverse excitation of the laser rod.

Yet another object of the present invention is to provide conductive cooling of the laser rod. Conductive cooling is carried out by a ceramic heat conductor, since ceramic material is a good heat conductor. The ceramic heat conductor is positioned opposite the diode array, and is also used as a light reflector. The unabsorbed diode light is reflected back by the ceramic material into the laser rod. The ceramic material thus performs the dual function of a heat conductor and a light reflector.

Still a further object of the present invention is to enhance radially symmetrical heat dissipation from the laser rod by adjusting the thermal conductivity of the optical coupler and the ceramic heat conductor/light reflector for radially symmetrical thermal gradients in the laser rod. The optical coupler thus performs the dual function of a light coupler and conductor of the heat produced by the diode light.

According to the invention, this is achieved by providing a diode pumping module for a laser system, comprising a diode light source for excitation of said laser rod, said diode source being constituted by at least one diode array; a dual-function optical coupler/heat conductor located on one side of said laser rod between said at least one diode array and said laser rod, and attached to said rod, which coupler/heat conductor guides the light from said diode source into said rod while adjusting the angular spread of said light and also serves as heat conductor, conducting heat away from said rod; a dual-function heat conductor/light reflector located on the opposite side of said laser rod and attached to said rod, which conductor/reflector conducts the heat away from said laser rod and reflects back into said rod unabsorbed diode light.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

In the drawings:

FIG. 1 is a cross-sectional view of a diode pumping module illustrating a first embodiment of the invention;

FIG. 2 is a cross-sectional view of a diode pumping module illustrating a second embodiment of the invention;

FIG. 3 is a cross-sectional view of a diode pumping module illustrating a third embodiment of the invention, and FIG. 4 is a cross-sectional view of a diode pumping module illustrating a fourth embodiment of the invention.

DETAILED DESCRIPTION OF PREFERRED EMBODIMENTS

FIG. 1 shows a cross-sectional view of a diode pumping module of a solid-state laser. The diode pumping module comprises diode arrays used as the pumping source. Parallel to diode array 2 is disposed a solid state laser rod 4 of a laser material such as Nd:YAG or Nd:YLF. An optical coupler 6 is positioned between diode array 2 and laser rod 4. The optical coupler is made from suitable material such as sapphire crystal or undoped YAG crystal, is shaped to guide a maximum amount of diode light into rod 4, and is advantageously coated with an anti-reflection coating for the specific diode light wavelength.

Surface 7 of coupler 6 is cylindrically concave and is attached or bonded to rod 4, using an optically transparent cement. Surfaces 8, which face away from surface 7, are planar.

Opposite diode array 2 is positioned a ceramic heat conductor/light reflector 9, made from a suitable material such as alumina and having a surface 10 that is cylindrically concave, by which it is attached or bonded to laser rod 4, using a transparent cement. Heat conductor/reflector 9 is mounted on a thermally conductive U-shaped support member (not shown) to cool the module.

Clearly, other arrangements are possible. For example, optical coupler 6, ceramic heat conductor/light reflector 8 and diode array 2 could be attached to a common thermally conductive support member to cool the module.

Another embodiment of the invention is illustrated in FIG. 2. In this embodiment, two diode arrays 2 are positioned at an angle with respect to each other. This embodiment provides diode light coupling for twice as many diode arrays 2, as was the case in the embodiment of FIG. 1.

A third embodiment of the invention is illustrated in FIG. 3. In the third embodiment, three diode arrays 2 are positioned at an angle with respect to each other. This embodiment provides diode light coupling for three times as many diode arrays 2 as in FIG. 1.

A fourth embodiment of the invention is represented in FIG. 4. In this embodiment, optical coupler 6 and heat conductor/light reflector 9 are troughshaped and complement one another to form a substantially tubular structure.

During operation, diode arrays 2 pump light into laser rod 4. The light emitted by diode arrays 2 has a large divergence angle. Optical coupler 6 is shaped to adjust the angular spread of the diode light such that a uniform excitation of rod 4 is obtained. The diode light is absorbed partially by laser rod 4, exciting its atoms, so that an optical gain is generated. The unabsorbed portion of the diode light is reflected back into laser rod 4 by ceramic heat conductor/light reflector 8 for a second-pass absorption in laser rod 4. The heat generated during diode pumping is extracted from laser rod 4 by ceramic heat conductor/light reflector 8 and by optical coupler 6. Radially symmetrical temperature distribution in laser rod 4 is obtained due to a tailored thermal conductivity of the optical coupler/heat conductor and ceramic heat conductor/light reflector 9.

While the diode pumping module according to the invention was described as working with an Nd:YAG or Nd:YLF rod, it should be noted that it will work with any solid-state laser material.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A diode pumping module for a laser system, comprising:

a laser rod and a diode light source for excitation of said laser rod, said diode source being constituted by at least one diode array;

a dual-function optical coupler/heat conductor, made of a transparent material, located on one side of said laser rod between said at least one diode array and said laser rod and attached to said rod, said optical coupler/heat conductor being operative to guide light from said diode light source into said rod while adjusting the angular spread of said light and also serving as a heat conductor to conduct heat away from said rod; and a dual-function heat conductor/light reflector, made of a non-transparent material, located on a side of said laser rod opposite to said one side and attached to said rod, said heat conductor/reflector being operative to conduct heat away from said laser rod and to reflect unabsorbed diode light back into said rod.

2. The module as claimed in claim 1, wherein said diode light source is constituted by two diode arrays.

3. The module as claimed in claim 1, wherein said diode light source is constituted by three diode arrays.

4. The module as claimed in claim 1, wherein said optical coupler is made of sapphire.

5. The module as claimed in claim 1, wherein said optical coupler is made of undoped YAG.

6. The module as claimed in claim 1, wherein said heat conductor/light reflector is made of a ceramic material.

7. The module as claimed in claim 6, wherein said ceramic material is alumina.

8. The module as claimed in claim 1, wherein said coupler has planar surfaces that face away from said rod, said at least one diode array being positioned adjacent one of said planar surfaces.

9. The module as claimed in claim 1, wherein a surface of said coupler by which it is attached to said rod is cylindrically concave.

10. The module as claimed in claim 1, wherein a surface of said heat conductor/reflector by which it is attached to said rod is cylindrically concave.

11. The module as claimed in claim 1, wherein said optical coupler and said heat conductor/light reflector are trough-shaped and complement one another, to form a substantially tubular structure surrounding said rod.

* * * * *